United States Patent [19]

Arrowood et al.

[11] Patent Number: 5,881,051
[45] Date of Patent: Mar. 9, 1999

[54] MANAGEMENT OF ROUTE TESTING IN PACKET COMMUNICATIONS NETWORKS

[75] Inventors: Andrew Hilliard Arrowood, Raleigh; Charles A. Carriker, Jr.; Jia-bing Robin Cheng, both of Cary; Anne Siegman Magnuson, Raleigh; Sharon Marie McClernan, Cary, all of N.C.; John Mark Pechacek, Rochester, Minn.; Leo Temoshenko, Raleigh; Laura Marie Petri, Cary, both of N.C.

[73] Assignee: International Business Machines, Armonk, N.Y.

[21] Appl. No.: 500,031

[22] Filed: Jul. 10, 1995

[51] Int. Cl.$^6$ .................................................. H04L 12/26
[52] U.S. Cl. ........................ 370/248; 370/400; 371/20.1
[58] Field of Search ................................. 370/235, 241, 370/242, 244, 245, 243, 248, 249, 250, 252, 400; 371/3, 20.1, 20.4, 20.5; 340/826, 827, 825.06

[56] References Cited

U.S. PATENT DOCUMENTS

| | | | |
|---|---|---|---|
| 4,750,175 | 6/1988 | Brenneman et al. | 371/22 |
| 5,170,393 | 12/1992 | Peterson et al. | 370/255 |
| 5,271,058 | 12/1993 | Andrews et al. | 379/210 |
| 5,276,440 | 1/1994 | Jolissaint et al. | 340/825.02 |
| 5,280,474 | 1/1994 | Nickolls et al. | 370/389 |
| 5,280,480 | 1/1994 | Pitt et al. | 370/256 |
| 5,297,137 | 3/1994 | Ofek et al. | 370/403 |
| 5,331,635 | 7/1994 | Ota | 370/401 |
| 5,355,371 | 10/1994 | Auerbach et al. | 370/255 |

*Primary Examiner*—Chi H. Pham
*Assistant Examiner*—Ricky Q. Ngo
*Attorney, Agent, or Firm*—Stephen T. Keoha; Joh J. Timar

[57] ABSTRACT

A packet communications network includes a centrally controlled route testing system in which each node includes test results tables containing the results of all path tests originated at that node. A centralized route management facility initiates a path test originating at any node by remotely altering a trigger value in a trigger data object at that node. A general results table contains general test results for an entire path between the local node and a remote node while a detailed test results table contains detailed, hop-by-hop test results for each transmission leg of a multi-leg path. The general results table contains a name trigger field for identifying a point-to-point path to be tested, and a connection trigger field for identifying a link-by-link path to be tested.

14 Claims, 5 Drawing Sheets

FIG. 1

| GENID | TEST TYPE | CONN TRIGGER | NAME TRIGGER | RESULTS | PATH | PROTOCOL SPECIFICS |
|---|---|---|---|---|---|---|
| 20 | 22 | 23 | 24 | 25 | 26 | 27 |

| TEST ID | SUBTEST ID | DEST. NODE | PRIOR NODE | LAST LINK ID | ELASPED TIME | RESULT |
|---|---|---|---|---|---|---|
| 40 | 41 | 42 | 43 | 44 | 45 | 46 |

MANAGEMENT OF ROUTE TESTING IN PACKET COMMUNICATIONS NETWORKS

TECHNICAL FIELD

This invention relates to packet communications systems and, more particularly, to methods and apparatus for the central management of route testing in such systems.

BACKGROUND OF THE INVENTION

In the co-pending application of John G. Stevenson, Ser. No. 08/236,800, filed May 2, 1994, now U.S. Pat. No. 5,566,880 and assigned to applicants' assignee, a system is described in which a path test command is launched in a network, following a path determined in the same way as a normal data transfer from a source to a destination in a so-called connectionless network, that is, in a network in which the transmission path is not predetermined prior to the transmission of data. At each node encountered along the connection path, the path test command initiates a path test identifying that node and the current time. These results of the path test are sent back to the node initiating the path test command. Thus, as the path test command traverses the data path, a sequence of test results flow from each of the nodes encountered along the path back to the originating node. As noted in the aforementioned patent application, these results can be combined at the originating node to determine the response time of the entire path from source to destination, the response time of each leg along this path, and hence the identification of congestion points in the path. If the destination node is never reached, the returned test results serve to identify the first encountered failed transmission leg or node. This testing approach has the advantage of being useful with connectionless networks as well as pre-calculated routing protocol path networks. This testing approach has the disadvantage, however, of requiring each and every resource in the network to be modified so as to be responsive to the path test command.

Another route testing technique is disclosed in T. Hefel et al. application Ser. No. filed 08/500,674, filed Jul. 10, 1995, now U.S. Pat. No. 5,563,875 also assigned to applicants' assignee, in which a source node launches a plurality of wrap around test messages, one for each node in the path between the source node and the destination node. Each message includes a launching time which can be used to determine the round trip transit time to the corresponding intermediate (and destination) node and thus the link delay times. As with the previous application Ser. No. 08/236,800, these times can be used to determine link or node failures, congestion points and route performance. Although this latter test method requires no changes in the network except at the wrap around test source, it has the disadvantage of being useful only with pre-calculated route protocol paths.

Packet switching networks normally have a network supervisor who is responsible for the overall management of the network. In order to manage the route testing function from a central location, it is necessary to initiate, and to ascertain the results of, path tests from a central location. The most common control command mechanism available for managing packet networks is known as the Simple Network Management Protocol (SNMP). In the SNMP system, a simple "GET" or "GET_NEXT" command is used to obtain a single stored value from a remote node in the packet network. Similarly, a simple "SET" command is used to set a single value in a remote node of the packet network. Unfortunately, this simple command structure does not lend itself well to obtaining the detailed results of the path tests necessary for centralized test management. In the prior art systems utilizing such a limited command structure, it is difficult or impossible to centrally manage the route tests for the entire packet transmission system. Without central management, each node must manage all of the tests originating at that node, requiring duplication of the test management facilities at each of the nodes, thereby increasing the cost and complexity and reducing the throughput of the network.

SUMMARY OF THE INVENTION

In, accordance with the illustrative embodiment of the present invention, a test data storage and access system is provided which provides central management of route testing in systems having a limited protocol control command structure. More particularly, a plurality of data objects (unique data storage locations), called triggers, at the test origination node are used as triggers to initiate route tests. In response to the remote setting of a value in one of these data objects, a route test is initiated on the route identified by the value set in the trigger object. In response to the trigger, test data table entries are created at the node originating the route (connection) test. A first set of fields in at least one of these data tables are used to store the trigger value used to initiate the new route test.

The value of a trigger object can be set from a remote route management center by the use of a simple command to set a value remotely, such as the SNMP "SET" command. Other sets of fields in the test data tables can be sequentially accessed from the remote test management location, using commands such as the SNMP "GET" and "GET_NEXT" commands, to provide the desired level of detailed test results necessary for test management.

It can be seen that the remotely controlled route testing system of the present invention makes it possible to centrally manage all of the route tests in an entire packet network from a single test management node, using only a simple SNMP-like command structure. This centralized route management reduces duplication, cost, and complexity of the route test management function.

In accordance with one feature of the present invention, a general results test data table entry is created and maintained to hold the general results of a path test, i.e., in progress, OK, or Not OK. Also included in the general results table are one or more storage fields to hold the trigger value used to initiate the test leading to that entry in the general results table. The general results table also includes a result field containing IN PROGRESS and OK/Not OK information about the identified connection test.

In accordance with one aspect of the present invention, separate trigger data objects are provided for point-to-point tests of a transmission path between node A and node B, called a name trigger, and for a test of a specific, identified route, specified in the general results table entry and called a connection trigger. A simple "SET" command sets the name or connection trigger, while a simple "GET" command can retrieve the contents of the result field. The name trigger is the name of the target node to which the test is directed, while the connection trigger is the identification of a pre-defined connection specifying the node and link sequence from the originating node to the destination node.

In accordance with another feature of the present invention, a detailed test results table is maintained in each originating node to record the detailed, hop-by-hop test results of the path tests. Detailed test result entries are generated with both name triggers and connection triggers.

In response to a connection trigger, a detailed result table entry is made for each hop of the identified connection. A sequence of simple "GET" or "GET_NEXT" commands can then be used to retrieve the contents of the detailed result table entries for a single path test.

It can be seen that simple SNMP commands can be used to remotely control route management from a single management center which can be located at one node of a multi-node packet network. These simple commands serve to both initiate a path test and to obtain the results of such path tests, including both point-to-point test results and identified connection path test results.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
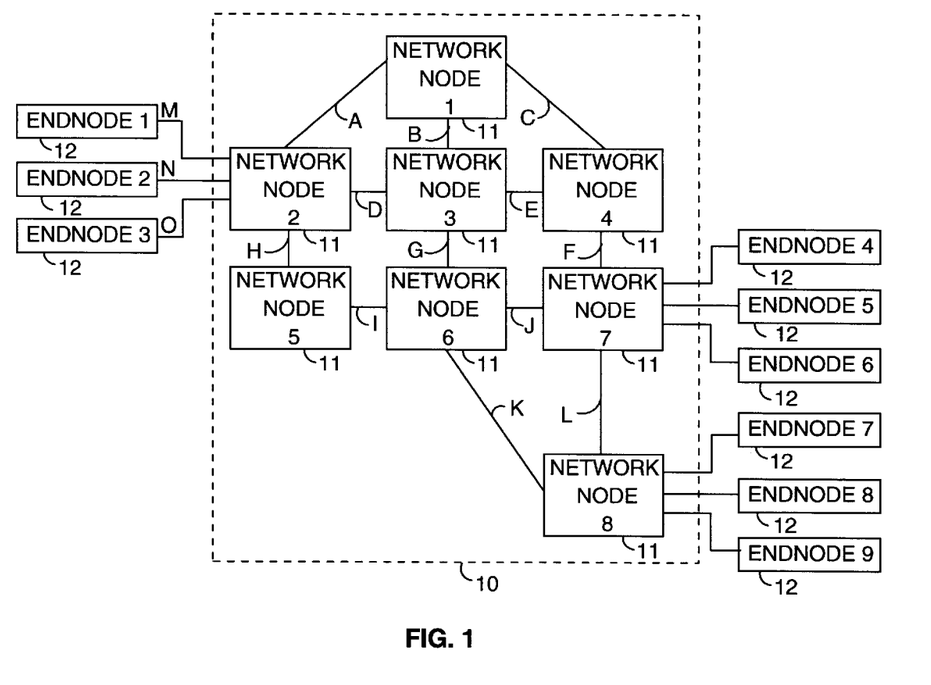
FIG. 1 shows a general block diagram of a packet communications network in which a centralized route management system in accordance with the present invention might find use.

Referring more particularly to FIG. 1, there is shown a general block diagram of a packet transmission system 10 comprising eight network nodes 11 numbered 1 through 8. Each of network nodes 11 is linked to others of the network nodes 11 by one or more communication links A through L. Each such communication link may be either a permanent connection or a selectively enabled (dial-up) connection. Any or all of network nodes 11 may be attached to end nodes, network node 2 being shown as attached to end nodes 1, 2 and 3, network node 7 being shown as attached to end nodes 4, 5 and 6, and network node 8 being shown as attached to end nodes 7, 8 and 9. Network nodes 11 each comprise a data processing system which provides data communications services to all connected nodes, network nodes and end nodes, as well as providing decision points within the node. The network nodes 11 each comprise one or more decision points within the node, at which point incoming data packets are selectively routed on one or more of the outgoing communication links terminated within that node or at another node. Such routing decisions are made in response to information in the header of the data packet. The network node also provides ancillary services such as the calculation of new routes or paths between terminal nodes, the provision of access control to packets entering the network at that node, and the provision of directory services and topology database maintenance at that node. In accordance with the present invention, one or more of network nodes 11 can also comprise a routing control and test management system.

Each of end nodes 12 comprises either a source of digital data to be transmitted to another end node, a utilization device for consuming digital data received from another end node, or both. Users of the packet communications network 10 of FIG. 1 may utilize an end node device 12 connected to the local network node 11 for access to the packet network 10. The local network node 11 translates the user's data into packets formatted appropriately for transmission on the packet network of FIG. 1 and generates the header which is used to route the packets through the network 10.

In order to transmit packets on the network of FIG. 1, it is necessary to calculate a feasible path or route through the network from the source node to the destination node for the transmission of such packets. To avoid overload on any of the links on this route, the route is calculated in accordance with an algorithm that insures that adequate bandwidth is available on each leg of the new connection. One such optimal route calculating systems is disclosed in the afore-mentioned patent application Ser. No. 08/236,800, filed May 2, 1994 now U.S. Pat. No. 5,566,880. Once such a route is calculated, a connection request message is launched on the network, following the computed route and updating the bandwidth occupancy of each link along the route to reflect the new connection. Data packets may then be transmitted along the calculated route from the originating node to the destination node by placing this route in the header of the data packet.

Figure 2:
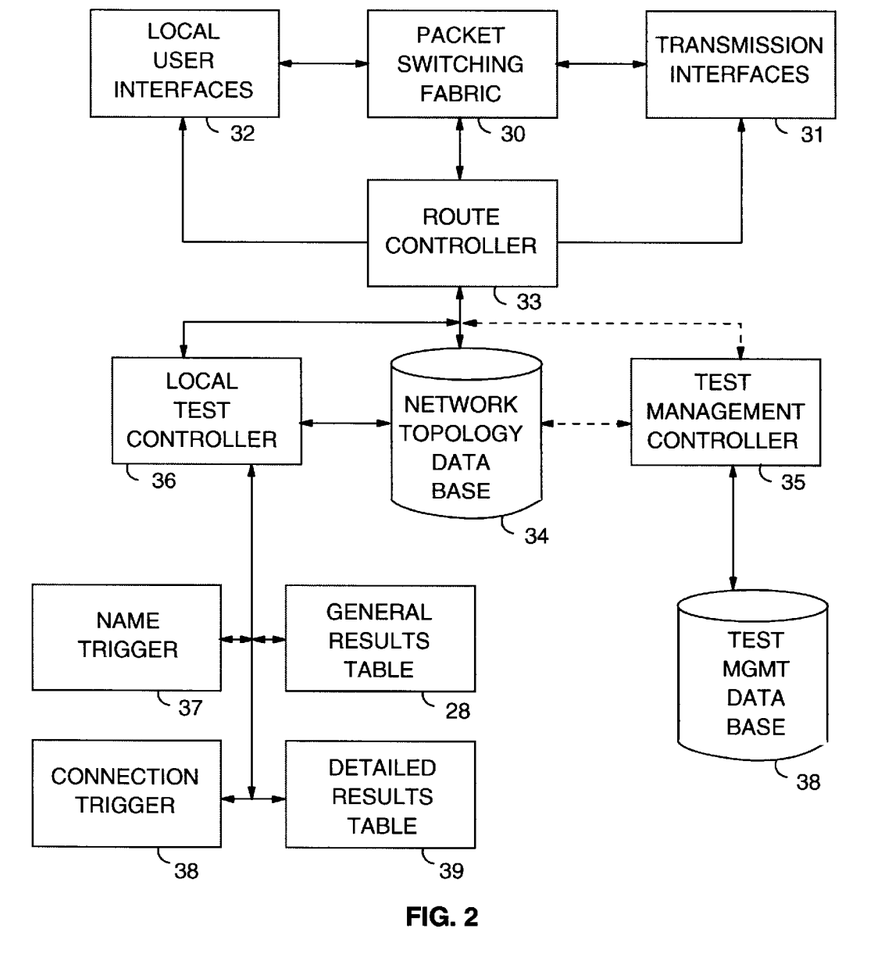
FIG. 2 shows a more detailed block diagram of typical decision point in the network of FIG. 1 at which point packets may enter the network or be forwarded along the route to a destination for each packet, and in which route testing facilities as well as a centralized test management system in accordance with the present invention might be found.

In FIG. 2 there is shown a general block diagram of a network node control circuit which might be found in the nodes 11 of FIG. 1. The node control circuit of FIG. 2 comprises a high speed packet switching fabric 30 onto which packets arriving at the node are entered. Such packets arrive over transmission links from other nodes of the network, such as links A–L of FIG. 1 via transmission interfaces 31, or are originated locally via local user interfaces 32. Switching fabric 30, under the control of route controller 33, connects each of the incoming data packets to the appropriate one of the outgoing transmission link interfaces 31 or to the appropriate one of the local user interfaces 32, all in accordance with well known packet network operations. Indeed, network management control messages are also launched on, and received from, the packet network in the same fashion as data packets. That is, each network packet, data or control message, transmitted on the network of FIG. 1 is routed by way of switching fabric 30, as shown in FIG. 2.

The route controller 33 is used to calculate optimum routes for messages originating at the node of FIG. 2. Controller 33 can, for example, use updated information in network topology data base 34 to calculate the optimum route using an algorithm such as that described in the afore-mentioned application Ser. No. 08/236,800. Once calculated, such optimum routes are stored locally at the node of FIG. 2 and used by route controller 33 to add this route to the header of all data packets to be forwarded to this destination. It can be seen that each and every packet launched from this node on the pre-calculated route to the desired destination follows the same identical path under the control of a pre-calculated routing vector stored in FIG. 2. Occasionally, it becomes desirable to check these pre-calculated paths for failures, congestion, et cetera. For example, if the performance of a particular route suddenly deteriorates (e.g., excessive delays or errors), it is desirable to identify the source of this deterioration in order to permit corrective action. A local test controller 36 is equipped to initiate such path tests and store the results of such path tests, all as described below. Suitable local test controllers 36 are disclosed in the aforementioned patent applications Ser. Nos. 08/236,800 and 08/500,674, now U.S. Pat. Nos. 5,566,880 and 5,563,875, respectively.

In accordance with the present invention, a test management controller 35 is provided at the node of FIG. 2 to centrally manage the testing of all of the data routes through the network of FIG. 1. The connections of test management controller 35 are shown in dotted lines to indicate that not all of the network nodes 11 (FIG. 1) need be equipped with a test management controller 35. Indeed, only one of network nodes 11 need be equipped with a test management controller 35, and that one network node is responsible for managing the testing of paths originating at all of the network nodes 11 of FIG. 1. Alternatively, a plurality of network nodes 11 can be equipped with test management controllers 35, but with only one of the controllers 35 enabled at one time, thus providing backup redundancy. Indeed, each and every node 35 can be fully equipped with the capability for network route test management, but only one enabled at a time. In any event, the node currently assigned the test management function is known as the "Manager" node while all other nodes of the network are know as "Agent" nodes. A test management data base 38 is provided in the Manager node to store the test management information.

In further accord with the present invention, the local test controller 36 is connected to a plurality, preferably two, of assigned storage locations 37 and 38 defined as trigger data objects which can be used to contain the identification of a route originating at that node. Since routes can be specified by simply identifying the destination node, or by identifying a particular path to a destination node, there are at least two types of trigger data objects, name trigger 37 for named destination nodes denominated routes, and connection trigger 38 for link-by-link denominated connection to the destination node. These trigger data objects 37 and 38 are monitored continuously by local test controller 36 to detect changes in the value stored in these trigger locations 37 and 38. Using simple "SET" commands such as the SNMP command, a remote Manager node containing a test management controller 35 issues such a command to set a desired value into one of trigger locations 37 or 38. When detected by the Agent node test controller 36, this change of value in the trigger location 37 or 38 initiates a path test of the type corresponding to the trigger location type.

Figure 3:
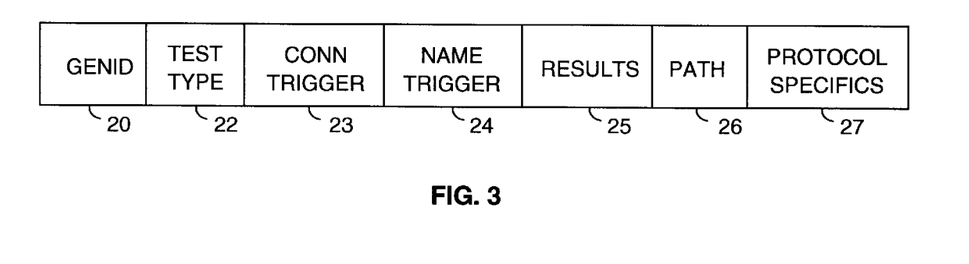
FIG. 3 shows a graphical representation of one entry in a general results table in the test data base of the route testing facilities shown in FIG. 2.
Figure 4:
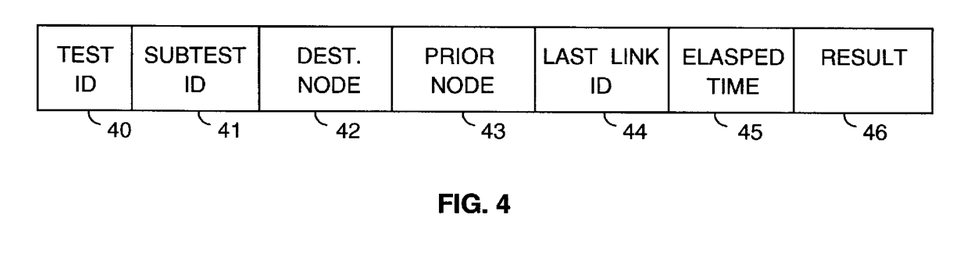
FIG. 4 shows a graphical representation of one entry in a detailed results table in the test data base of the testing facilities shown in FIG. 2.

Local test controller 36 is also connected to two test results tables, a general test result (GTR) table 28, one entry of which is detailed in FIG. 3, and a detailed test result (DTR) table 39, one entry of which is detailed in FIG. 4. The results of each test initiated by a change in a trigger value in location 37 or 38 is recorded in both GTR table 28 and DTR table 39.

Before proceeding to FIG. 3, it should be noted that the circuits of FIG. 2 can be realized as special purpose circuitry by persons of ordinary skill in that art. In the preferred embodiment, however, all of the control functions described in connection with FIGS. 5 through 9 are realized by programming a general purpose computer. The preparation of the programs necessary to accomplish these functions are obvious to persons of ordinary skill in the programmed packet network node art, particularly in view of the detailed flow charts to be described in connection with FIGS. 5 through 9.

In FIG. 3 there is shown a graphical representation of a single entry in the general test results (GTR) table 28 (FIG. 2). In accordance with the present invention, and as noted above, the testing facilities in each of the Agent nodes 11 (FIG. 1) each include two such tables, a general test results (GTR) table 28 and a detailed test results (DTR) table 39. GTR table 28 contains one entry for each path test originating at that Agent node, and having the format described in connection with FIG. 3. DTR table 39 contains one entry for each hop of each path test originating at that Agent node, and having the format described in connection with FIG. 4. It is to be noted that a route can include only one hop if the destination node is an immediately adjacent node and, in that case, only one entry in DTR table 28 will be created. In accordance with the present invention, all of the paths initiated at an Agent node can be managed from the Manager node by the use of only simple "SET," "GET" and "GET_NEXT" commands issued from the centralized test management controller 35 in the Manager node and operative to set trigger data objects 37 and 38 in any of the Agent nodes 11 of the network of FIG. 1 and to retrieve entries from GTR table 28 and DTR table 39 in those Agent nodes.

Returning to the GTR entry of FIG. 3, the first field 20 of the general results table 28 entry is a general results table entry identification number. This general identification entry (GenId) field 20 serves to uniquely identify each of the entries in the GTR table, and may simply be a sequential number assigned when the entry is created. The second field 22 of GTR table 28 comprises an identification of the type of test which those results represent, i.e., a hop-by-hop connection test or Agent-to-Named-Agent, point-to-point path test, as described above. A connection trigger field 23 serves to store the value of the connection trigger 38, while a name trigger field 24 serves to store the value of the name trigger 37.

The next field 25 of the general test results table (GTR) entry of FIG. 3 comprises the general results of the test initiated by a change in the connection trigger 37 or the name trigger 38. This general result in field 25 is merely an "IN PROGRESS, "OK" or a "NOT OK" (path not available) indication. If the path is "OK," field 26 contains an identification of the actual path tested by the path test. For a connection triggered path, this path in field 26 is the path which corresponds to the connection value specified in the "SET" command. For a name triggered path, however, this path is the path actually traversed by the path test, as set up by the Agent node. Finally, field 27 can be used to contain information that is specific to the communications protocol used to implement the remote control of the path testing function, as will be described in connection with FIGS. 5 through 9.

The GTR table 28 of FIG. 2 is continuously monitored by the use of "GET" commands from the Manager node to detect the change in the results field 25 from "IN PROGRESS" to "OK" or "NOT OK." When such a change is first detected, the Manager node initiates a series of "GET" or "GET_NEXT" commands to retrieve the results in the DTR table, to be described in connection with FIG. 4.

It can be seen that the general test result entry of FIG. 3 contains the general results of either named point-to-point or connection protocol paths tested. In accordance with the present invention, the general test result entry of FIG. 3 also includes two trigger fields 23 and 24 which contain the value of the trigger 37 or 38 set remotely from a Manager node and which, when set, initiates the path test corresponding to the GTR table entry of FIG. 3. The trigger objects 37 or 38 therefore allow the initiation of complex path tests with nothing more than the setting of a single value in the Agent. These path initiations can therefore be implemented with very simple protocol control commands, such as SNMP, with the primitive capability of remotely setting a single stored value. While the SNMP system is the preferred control message protocol, due to its simplicity, this capability is already available in other protocols such as the Common Management Information Protocol (CMIP) or the Systems Network Administration Management Services (SNA/MS) protocol.

In FIG. 4 there is shown a graphical representation of a single entry in the detailed test results (DTR) table 39. The detailed test results table 39 contains one entry, not for each path test originated at that local Agent node, but one entry for each transmission leg of each path test originated at that local Agent node. The detailed results table 39 is therefore larger and more complex than the general results table since a plurality of entries is typically required for each test originated at that local Agent node. The DTR table entry of FIG. 4 includes a test identification field 40 containing a unique identification of the test causing this particular test result entry. The test identification in field 40 corresponds to the "GenId" value from the GTR table entry of FIG. 3, and allows the association of corresponding GTR and DTR table entries. A sub-test identification field 41, in turn, contains a unique identification of the sequence number of the particular hop or link of this test corresponding to this particular DTR entry. The sub-test identification values can also be issued sequentially when the corresponding DTR entry is created. Field 42 contains an identification of the test destination Agent node for the test while field 43 contains an identification of the node just prior to the destination node in the test path. Field 44 contains an identification of the last link itself. It will be noted that each DTR entry corresponds to a test of the path to each of the successive nodes in the tested path. The contents of fields 43 and 44 specifically identify the last hop corresponding to the test results in that entry. Field 45 contains the elapsed time for the transit time from the source Agent node to the node identified by field 42. Finally, field 46 contains a result for this portion of the connection test in the form of an "OK" or "NOT OK" result.

It can be seen that the table entries of FIGS. 3 and 4 capture all of the significant parameters of a point-to-point path test, sometimes called a "PING" test, and all of the significant parameters of a route protocol, link-by-link path test. Moreover, such path tests can be initiated by simply setting a value in one or the other of two triggers 37, 38 in the Agent node identifying the route to be subjected to that test. Since such a value-setting operation can be carried out from a remote Manager node, the control of such tests can be centralized at the Manager node for all paths in the network, thereby concentrating the path test analysis capability and the path test analysis personnel at one centralized Manager node. This centralized arrangement is well adapted to the centralized network supervision arrangement already used in most packet networks. The detailed processes for carrying out these centralized path test management functions are illustrated in FIGS. 5 through 9.

Figure 5:
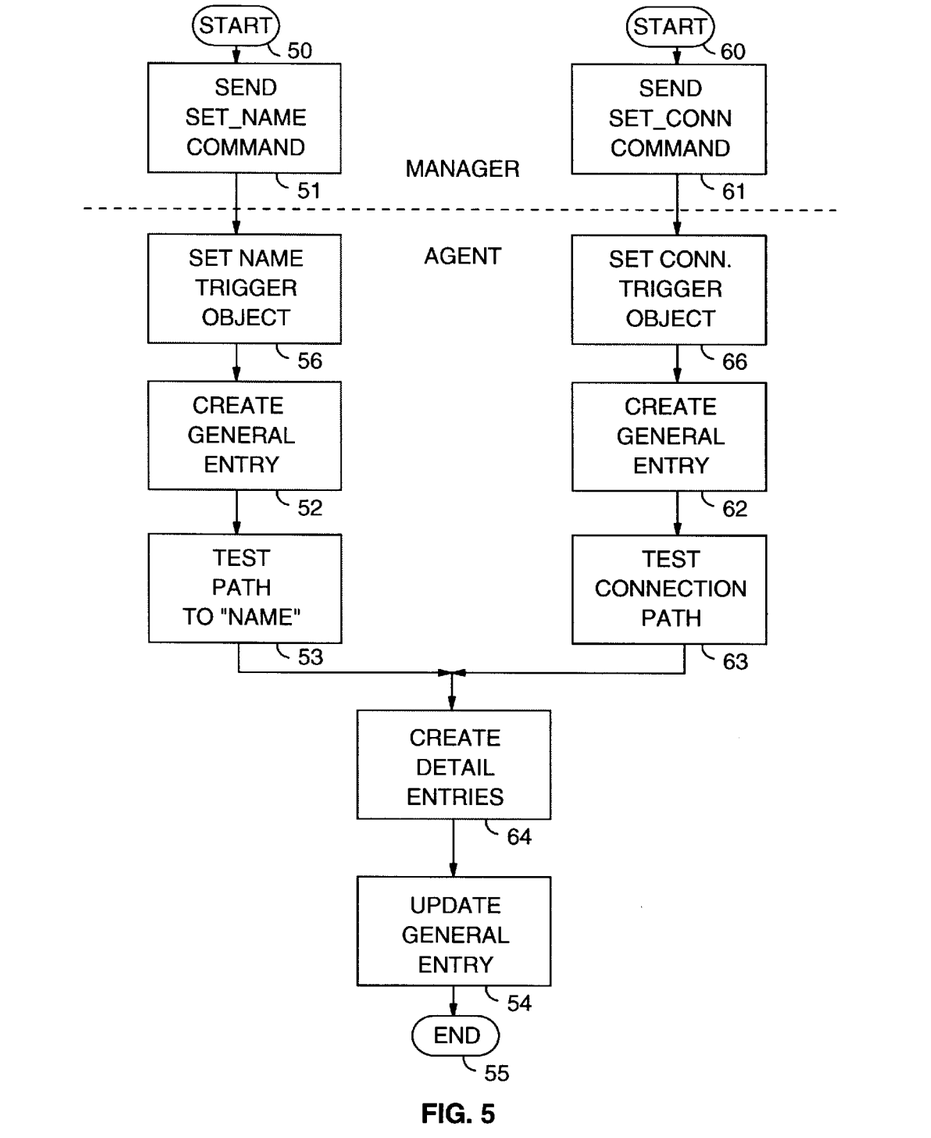
FIG. 5 shows a general flow chart of the process for initiating and completing both a point-to-point route test or a connection route protocol test in accordance with the present invention.

Referring more particularly to FIG. 5, there is shown a detailed flow chart of the process for initiating a path test by setting a name trigger object in an originating Agent node. Starting in start box 50, box 51 is entered where a "SET_NAME" command is launched from the Manager node. This "SET_NAME" command is transmitted to the desired Agent node, using an appropriate path identifier field in the command. At the remote Agent node, box 56 is entered where the name trigger value in the "SET_NAME" command is set in the name trigger 37 in the Agent node. Box 52 is then entered where, in response to the change in value of the name trigger in box 56, an entry is created in the general test results table, similar to the entry of FIG. 3. The name trigger field 24 (FIG. 3) of this entry is set to the name of the second (target) Agent node, specified in the "SET_NAME" command. A path test is then initiated in box 53 from the local Agent node to the named target Agent node. This route test, sometimes called a PING test, is launched on the network to the named target Agent node and then returned to the originating Agent node. The originating Agent node utilizes the route controller 33 (FIG. 2) to calculate a new route to the named target node, even when a route already exists. The path test command or commands are launched on this route to test the individual links in the route. When the test results are returned to the originating Agent node, box 64 is entered where, in response to the received test results, detailed results table entries are created to record the results of each of the hop-by-hop tests. Box 54 is then entered to update the general test results table entry created in box 52 to reflect the results of the new test.

The flow chart of FIG. 5 is also useful for showing the process for initiating a connection test where the specific link-by-link route is specified by the Manager node. Starting at start box 60, box 61 is entered where a "SET_CONN" command is sent from the Manager node to the Agent node which is the originating node of the connection specified in the "SET_CONN" command. The "SET_CONN" command is launched from the Manager node onto the network of FIG. 1 directed to the Agent node corresponding to the identified originating Agent node for the route specified in the identified connection. At the Agent node, box 66 is entered where the connection trigger 38 (FIG. 2) in the Agent node is set to the value of the connection identification in the "SET" command. In response to this change in the contents of the trigger data object in box 66, box 62 is entered where a general results table entry is created in the GTR table 28 of FIG. 2. In box 63, the connection test is initiated, using one or the other of the techniques disclosed in the aforementioned patent applications Ser. No. 08/236,800 and (U.S. Pat. No. 5,566,880) and 08/500,674 (U.S. Pat. No. 5,563,875) and following the exact path, link by link, specified in the connection identified in the "SET_CONN." command. In box 64, as the results of the hop tests are completed, entries are created in the detailed test results table 39 of FIG. 2, one for each hop of the identified path or route. After creation of the entries in the detailed test results table 39, the general test results table 28 is updated in box 54 to reflect the general results of the test. As previously noted, the process of FIG. 5 terminates in the end box 55.

It will be noted that the "SET" commands used in FIG. 5 do not require any type of time-out, unlike the "GET" commands used in the prior art to initiate route tests. Moreover, the test results are stored at the originating node of the path and thus available whenever the Manager node desires to retrieve these results, using a "GET" or "GET_NEXT" command. The test results therefore cannot be lost due to a time-out caused by congestion, bursts of high priority traffic, or other faults or interference with transmission. It will also be noted that the processing of "SET_NAME" and "SET_CONN" commands in FIG. 5 are identical, the only difference being the source of the path identification. Note that the Manager node is able to initiate a test for a route specified by the Manager route, a capability not previously available in the prior art.

Figure 6:
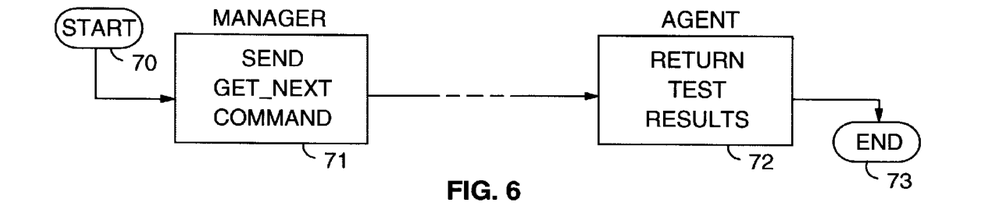
FIG. 6 shows a general flow chart of the process for obtaining data entries from both the general results table and the detailed results tables by a centralized test management system in accordance with the present invention.

In FIG. 6 there is shown a detailed flow chart of the process for retrieving one entry from either the general test results table 28 or the detailed test results table 39 at a particular Agent node. Starting in start box 70, box 71 is entered where a "GET_NEXT" command is sent from the Manager node to the desired Agent node. In box 72, in response to the "GET_NEXT" command, the particular identified table entry is retrieved from the table and returned to the Manager node. The entire contents of both the general test results table 28 (FIG. 2) and the detailed test results table 39 at a particular Agent node can be retrieved sequentially, one field of one entry or row at a time, using the process of FIG. 7. These test results are stored locally at the Manager node in route management data base 38 of FIG. 2. Furthermore, these types of test results can be retrieved from all of the Agent nodes of the network, thereby providing a data base at the Manager node suitable for managing route testing throughout the network. For example, if a test indicates that a route in use has failed, alternative routes can be tested for suitability prior to actual assignment of these new routes.

Figure 7:
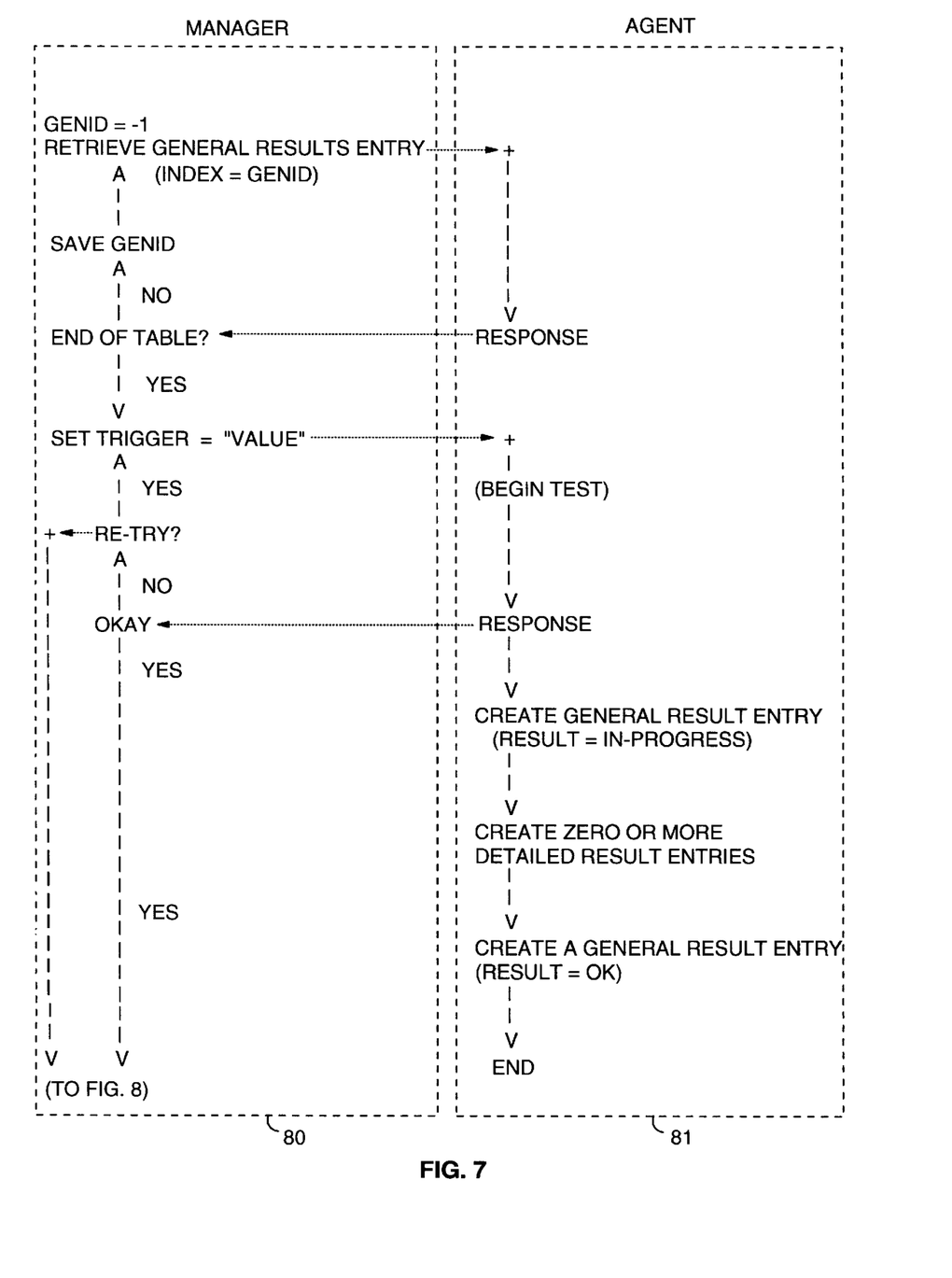
FIGS. 7 and 8, taken together, show a detailed flow chart of a typical process used for remotely managing tests in a the network of FIG. 1 in accordance with the present invention.
Figure 8:
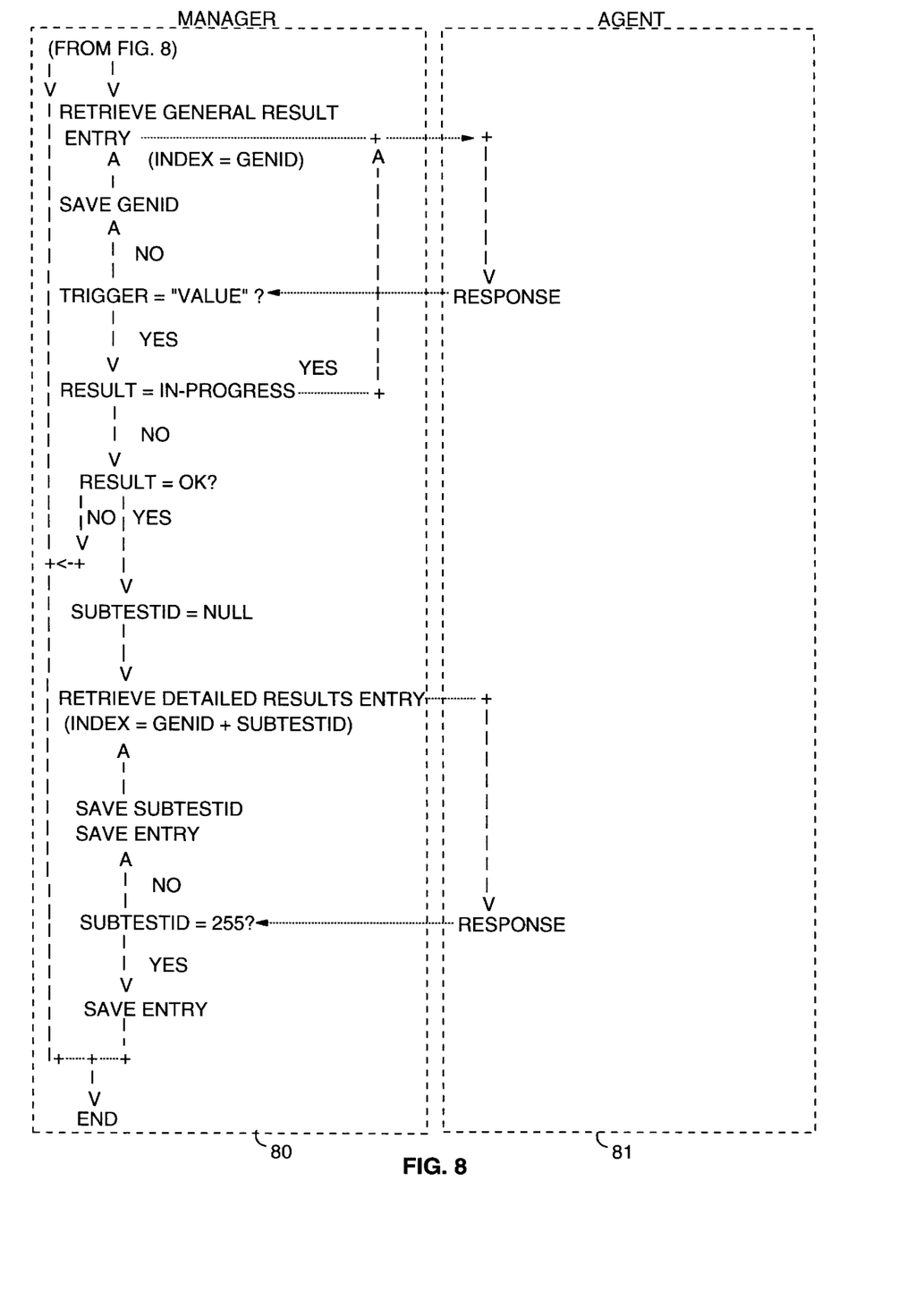

In order to better understand the operation of the present invention, a detailed example of a typical sequence of management commands will be discussed in connection with FIGS. 7 and 8. FIGS. 7 and 8, taken together, represent a flow chart of the detailed exchange of messages between a Manager node 80 and an Agent node 81 in the process of route management in the network of FIG. 1. In FIGS. 7 and 8, the left hand dashed box contains all actions taking place at the Manager node 80 and the right hand dashed box contains all actions taking place at the Agent node 81. It should be first noted that the general identification (GenId) field 20 of FIG. 3 contains an arbitrary identification of the general test results table entry. These GenId numbers may simply be sequential index numbers assigned as the entries are created.

Before initiating a new test for a particular route, it is desirable that the Manager node 80 ascertain an appropriate entry identification number (GenId) for the new test. A SMNP "GET_NEXT" command includes the identification of the data object (data field) desired, along with an index value for the entry immediately preceding the desired particular entry with that data object. Thus, a "GET_NEXT" command can be issued with the desired data object identified as the value of the general results index (GenId) field 20 (FIG. 3) itself. The Manager node 80 initializes the value of GenId as "−1" to insure that the remote Agent node 81 will retrieve the GenId field of the first entry of the general test results table 28. Thus, in FIG. 8, the Manager node 80 sets the saved GenId index to "−1." A "GET_NEXT" command is then issued from the Manager node 80 for the GenId field value of the GTR table entry with this GenId table index. When received at the Agent node 81, this message causes the Agent node 81 to return an index value for the next (first) entry of the general test results table. Since this entry does not represent the end of the table, this value is substituted for the saved value and a new "GET_NEXT" command for the general test result table index value in the next GTR table entry. This retrieval of successive index values continues until the response indicates that this value is the end of the general test results table entries, i.e., there is not a "next" table entry. This value is useful to the Manager node 80 to determine where to retrieve the results of the path test to now be initiated.

The Manager node 80 then issues a "SET" command to set the trigger data object in Agent node 81 with the value representing the identification of the path to be tested, either a name trigger identification or a connection trigger identification. When this value change in the trigger object at the Agent node 81 is detected, the identified path test (identified by the "value" in the trigger data object) is initiated. As previously noted, the specified value can be the identification of a named destination node to which a point-to-point test is to be effected, or the specified value can be the identification of an existing valid route to a destination node. The "SET_NAME" or "SET_CONN" command specifies the value to which the specified trigger 37 or 38 is to be set. The remote Agent node 81 will always calculate a new route. If the calculated route matches an existing route, that existing route will be used. If the calculated route does not match an existing route, the calculated route is created and used. The remote Agent node 81 will generate a SNMP "GET" response to the "SET" request indicating either that the request for a test was accepted ("OK") or that the test cannot be performed for some reason, e.g., an invalid connection path was specified. If the response is not "OK," the Manager node 80 retries the procedure for a fixed number of times, possibly after correcting errors in the "SET" command. When the test request is accepted ("OK"), the Agent node 81 creates an entry in its general results table indicating that the test is "IN-PROGRESS." The remote Agent node 81 then proceeds to perform the requested test, using the techniques of the aforementioned patent applications or the PING processing used in the well-known internet protocol (IP).

After the testing procedure is completed, the remote Agent node 81 will create zero or more detailed test result table entries, one for each successfully returned test, one for each hop of the route tested. If the test of the first link of the route fails, zero detailed results table entries will be made. When the entire detailed test results have been entered into the detailed test results table, the general test results table entry for this test will be updated by changing the "IN-PROGRESS" result to the appropriate result ("OK," "NOT_OK," partially successful, and so forth).

Turning to FIG. 8, the Manager node 80 monitors the general result field 25 (FIG. 3) of the general test results entry for this (GenId) test to ascertain when the value in this field changes from "IN-PROGRESS" to an actual result. That is, the general table entry is found by matching on the trigger value, either the connection trigger or the name trigger, depending on how this test was initiated. When the entry is found, the GenId is saved and the result field 25 of that entry is monitored. Thus the "GET_NEXT" command identifies the results field 25 and the table entry GenId. The remote Agent node 81 responds to this "GET_NEXT" command with the contents of field 25, tagged by the value of the GenId associated with this test. At the Manager node 80, this value of the trigger is compared with the value used to initiate the test. If these trigger values do not match, the GenId is saved and the "GET_NEXT" command reissued. Continued mismatches will result in an error routine being initiated.

If the trigger values match, and the results changes from "IN-PROGRESS" to the actual result, the Manager node 80 tests the actual result to determine if it is "OK." If not, the process is terminated and the attendant personnel alarmed to deal with the test failure. If the test results are "OK," the Manager node 80 issues a series of "GET_NEXT" commands to retrieve the contents of all of the detailed test results table entries for this test. To this end, two indices are used in the "GET_NEXT" command, one for the identification of this test (field 40 in FIG. 4) and one sub-test identification identifying the specific hop being currently reported (field 41 in FIG. 4). These sub-test identifications can be simply numbers beginning with "1" and incremented for each additional sub-test. The last entry in the detailed results table is specially marked to allow the Manager node 80 to identify this entry. In FIG. 9, the sub-test identification number "255" (higher than any anticipated hop count) is used to identify the last detailed result table entry. When this sub-test identification is recognized by the Manager node 80, it indicates that the detailed results entries have all been retrieved. This entry is saved and the process of FIGS. 7 and 8 terminated.

It can be seen that the process of FIGS. 7 and 8 serves to remotely initiate path tests in a packet transmission network and to retrieve the detailed results of these tests at a central route control management system located at one node of the network. This centralized route management control, in turn, reduces the cost and complexity of path management, and allows highly redundant path management capacity.

What is claimed is:

1. A packet communications network comprising
   a plurality of network nodes interconnected by transmission links;
   means at each of a plurality of source nodes for determining routes through said network from said each source node to corresponding destination nodes in said network;
   means for managing tests of said routes, said means for managing tests comprising:
      means at each of said source nodes for storing the results of route tests initiated at that source node;
      means at one of said network nodes for remotely and selectively setting a path identifying data value in each of said source nodes, and
      means in each said source node, responsive to said means for setting a value, for initiating a route test from the respective source node to the destination node identified by said identifying data value.

2. The packet transmission network according to claim 1 further comprising
   means in each said source node for initiating an endpoint-to-endpoint specified test between said source node and said identified destination node.

3. The network according to claim 1 further comprising
   means at each said source node for initiating a hop-by-hop specified test of a specified route between said source node and said identified destination node.

4. The network according to claim 1 further comprising
   means at each said source node for specifying the value of a trigger data object which, when specified, initiates a test of a data path from said source node, and
   means at each said source node for storing the general test results of each test initiated at that source node in a multi-field entry of a general test results table.

5. The network according to claim 1 wherein said route test further comprises
   sub-testing means for testing a portion of said route to each node in said route, and
   means at each said source node for storing the detailed test results of each sub-test initiated at that source node in a multi-field entry of a detailed test results table including the elapsed time for each of said sub-tests.

6. The network according to claim 4 wherein said value of a trigger data object comprises
   means for identifying a destination node in said network.

7. The network according to claim 4 wherein said value of a trigger object comprises
   means for identifying all of the sequential hops in a multi-hop route to a destination node in said network.

8. A method for managing route testing in a packet communications network comprising the steps of
   interconnecting a plurality of network nodes by transmission links;
   determining, at each of a plurality of source nodes, routes through said network from said each source node to corresponding destination nodes in said network;
   managing the testing of said routes, said step of managing comprising the steps of:
      storing, at each of said source nodes, the results of route tests initiated at that source node in a test result table;
      setting a path identifying data value in said source node remotely and selectively by one of said network nodes, and
      initiating, in response to remotely set changes in said data value in said source node, a route test.

9. The method according to claim 8 further comprising the step of
   initiating, in each of said source nodes, a point-to-point test between said source node and a specified destination node.

10. The method according to claim 8 further comprising the step of
    initiating, at each of said source nodes, a hop-by-hop test of a specified route between said source node and a specified destination node.

11. The method according to claim 8 further comprising the step of
    storing, at each said source node, the general results of each test initiated at that source node in a multi-field entry of a general test results table, said general test results entry including at least one entry indicating the suitability of that overall path for the transmission of data.

12. The method according to claim 8 wherein said step of initiating a route test further comprises the steps of
    testing a sub-portion of said route to each node in said route, and
    storing, at each said source node, the detailed test results of each sub-portion test initiated at that source node in a multi-field entry of a detailed test results table including the elapsed time for each of said sub-portion tests.

13. The method according to claim 11 further comprising the step of
    identifying a destination node in said network by remotely setting a trigger data object value at said source node.

14. The network according to claim 11 further comprising the step of
    identifying all of the sequential hops in a multi-hop route to a destination node in said network by remotely setting a trigger data object value at said source node.

\* \* \* \* \*